(12) United States Patent
Kitain et al.

(10) Patent No.: US 11,287,292 B2
(45) Date of Patent: Mar. 29, 2022

(54) SENSOR SYSTEM

(71) Applicant: Lockheed Martin Corporation, Bethesda, MD (US)

(72) Inventors: Joshua D. Kitain, Orlando, FL (US); David J. Macannuco, Burlington, MA (US); Aaron P. Miller, Orlando, FL (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 916 days.

(21) Appl. No.: 15/431,403

(22) Filed: Feb. 13, 2017

(65) Prior Publication Data

US 2018/0231404 A1    Aug. 16, 2018

(51) Int. Cl.

| | |
|---|---|
| *G01D 11/30* | (2006.01) |
| *G02B 27/01* | (2006.01) |
| *A42B 3/04* | (2006.01) |
| *H01R 12/78* | (2011.01) |
| *H01R 13/6581* | (2011.01) |

(Continued)

(52) U.S. Cl.
CPC .............. *G01D 11/30* (2013.01); *A42B 3/042* (2013.01); *A42B 3/0406* (2013.01); *G02B 27/0176* (2013.01); *H01R 12/78* (2013.01); *H01R 13/6581* (2013.01); *H01R 13/6598* (2013.01); *H01R 43/26* (2013.01); *G02B 2027/014* (2013.01); *G02B 2027/0138* (2013.01); *G02B 2027/0156* (2013.01)

(58) Field of Classification Search
CPC ...... G01D 11/30; G01D 11/245; G01D 11/24; G01N 29/225; G01N 29/265

USPC ......................................................... 73/866.5
See application file for complete search history.

(56) References Cited

U.S. PATENT DOCUMENTS

| | | | | |
|---|---|---|---|---|
| 4,051,534 A | * | 9/1977 | Dukich | G02B 27/017 348/211.4 |
| 4,833,726 A | * | 5/1989 | Shinoda | A42B 3/30 381/376 |

(Continued)

FOREIGN PATENT DOCUMENTS

| | | |
|---|---|---|
| CN | 104603865 A | 5/2015 |
| KR | 20150104809 A | 9/2015 |

(Continued)

OTHER PUBLICATIONS

Extended European Search Report for European Patent Application No. 18156190.3, dated Jul. 13, 2018, 10 pages.

(Continued)

*Primary Examiner* — Peter J Macchiarolo
*Assistant Examiner* — Mohammed E Keramet-Amircolai
(74) *Attorney, Agent, or Firm* — Foley & Lardner LLP

(57) ABSTRACT

A sensor system is provided. A body includes a first side extension configured to mount to a helmet, a second side extension configured to mount to the helmet, and a processing module support member coupled to the first side extension and the second side extension configured to accommodate a processing module. A first sensor sub-assembly is positioned at least partially in the first side extension. The first sensor sub-assembly includes a first cable that includes a first plug configured to be plugged into the processing module, and a first sensor communicatively coupled to the first plug via the first cable.

15 Claims, 14 Drawing Sheets

(51) Int. Cl.
*H01R 13/6598* (2011.01)
*H01R 43/26* (2006.01)

(56) References Cited

U.S. PATENT DOCUMENTS

| | | | |
|---|---|---|---|
| 6,560,029 B1* | 5/2003 | Dobbie | G02B 23/125 |
| | | | 2/6.1 |
| 6,849,849 B1 | 2/2005 | Warner et al. | |
| 7,113,618 B2 | 9/2006 | Junkins et al. | |
| 8,150,142 B2 | 4/2012 | Freedman et al. | |
| 8,984,665 B2* | 3/2015 | Celona | A42B 3/04 |
| | | | 2/422 |
| 9,210,963 B1* | 12/2015 | Ellis | H04B 1/385 |
| 9,216,347 B2 | 12/2015 | Mutschler et al. | |
| 9,225,419 B2* | 12/2015 | Masarik | H04B 10/11 |
| 9,285,589 B2 | 3/2016 | Osterhout et al. | |
| 10,492,555 B2* | 12/2019 | Lebel | A42B 3/04 |
| 2003/0071766 A1* | 4/2003 | Hartwell | A42B 3/30 |
| | | | 345/8 |
| 2008/0012702 A1* | 1/2008 | Feight | G01D 3/08 |
| | | | 340/539.22 |
| 2009/0236361 A1* | 9/2009 | Doelman | B67D 1/1252 |
| | | | 222/1 |
| 2009/0307826 A1* | 12/2009 | Rogers | A42B 3/04 |
| | | | 2/422 |
| 2010/0064405 A1* | 3/2010 | McGovern | A42B 3/225 |
| | | | 2/6.7 |
| 2010/0103267 A1* | 4/2010 | O'Rourke | H04N 7/183 |
| | | | 348/158 |
| 2011/0145981 A1* | 6/2011 | Teetzel | G02B 23/125 |
| | | | 2/422 |
| 2011/0197327 A1* | 8/2011 | McElroy | A42B 3/32 |
| | | | 2/2.5 |
| 2011/0239354 A1* | 10/2011 | Celona | A42B 3/04 |
| | | | 2/422 |
| 2013/0155244 A1 | 6/2013 | O'Rourke | |
| 2013/0215230 A1 | 8/2013 | Miesnieks et al. | |
| 2014/0000013 A1 | 1/2014 | Redpath et al. | |
| 2014/0020159 A1 | 1/2014 | Teetzel et al. | |
| 2014/0160250 A1 | 6/2014 | Pomerantz et al. | |
| 2015/0157079 A1* | 6/2015 | Auranen | A42B 3/04 |
| | | | 2/422 |
| 2017/0208262 A1* | 7/2017 | Sheridan | G06K 9/00771 |
| 2018/0287648 A1* | 10/2018 | Auerbach | G10K 11/18 |

FOREIGN PATENT DOCUMENTS

| | | |
|---|---|---|
| WO | 9531909 A1 | 11/1995 |
| WO | 2012047410 A1 | 4/2012 |
| WO | 2013152205 A1 | 10/2013 |
| WO | 2013171731 A1 | 11/2013 |
| WO | 2014144526 A2 | 9/2014 |

OTHER PUBLICATIONS

Dzyre, Nels, "10 Forthcoming Augmented Reality & Smart Glasses You Can Buy," http://www.hongkiat.com/blog/augmented-reality-smart-glasses/, accessed May 26, 2017, Hongkiat.com (HKDC), 12 pages.

Kotani, Hajime et al., "Mini Case Study: Virtual and Augmented Reality Debut on Rugged Tablets," Embedded Systems Engineering, Feb. 19, 2013, Extension Media, pp. 1-5.

Onboard, "Augmented Reality for the Armed Forces," http://onboard.thalesgroup.com/2016/06/15/augmented-reality-armed-forces/, Jun. 15, 2016, accessed May 26, 2017, THALES, 1 page.

Roberts, David C. et al., "Solider-worn augmented reality system for tactical icon visualization," SPIE Proceedings, Head- and Helmet-Mounted Displays XVII; and Display Technologies and Applications for Defense, Security, and Avionics VI, vol. 838305, 838305, 2012, Baltimore, Maryland, Society of Photo-Optical Instrumentation Engineers, pp. 1-12.

* cited by examiner

SENSOR SYSTEM

TECHNICAL FIELD

The embodiments relate generally to display technologies, and in particular to a sensor system for use with an external display device.

BACKGROUND

Head-mounted displays may be used in a number of different contexts, such as training, entertainment, or during the performance of a task, for example. Head-mounted displays are often used in conjunction with a sensor, such as a camera, that may sense attributes of an environment and alter the imagery that is displayed on the head-mounted display based on the sensed attributes. This may be useful, for example, in an augmented-reality context. Visualization systems that include a head-mounted display and a sensor are typically tightly integrated special-purpose assemblies manufactured as an integrated unit that offer no capability of using different display assemblies or different processing components.

SUMMARY

In one embodiment a sensor system is provided. The sensor system includes a body that includes a first side extension configured to mount to a helmet, a second side extension configured to mount to the helmet, and a processing module support member coupled to the first side extension and the second side extension that is configured to accommodate a processing module. A first sensor sub-assembly is positioned at least partially in the first side extension. The first sensor sub-assembly includes a first cable comprising a first plug configured to be plugged into the processing module, and a first sensor communicatively coupled to the first plug via the first cable.

In another embodiment a method for manufacturing a sensor system is provided. The method includes forming a plastic body substrate that includes a first side extension forming a first channel, a second side extension forming a second channel, and a processing module support member coupled to the first side extension and the second side extension. The processing module support member forms a chamber. The method further includes inserting in the first channel a first cable that is coupled to a sensor, the first cable having a first plug, the first plug being exposed to the chamber. The method further includes inserting in the second channel a second cable, the second cable having a second plug, the second plug being exposed to the chamber.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1A:
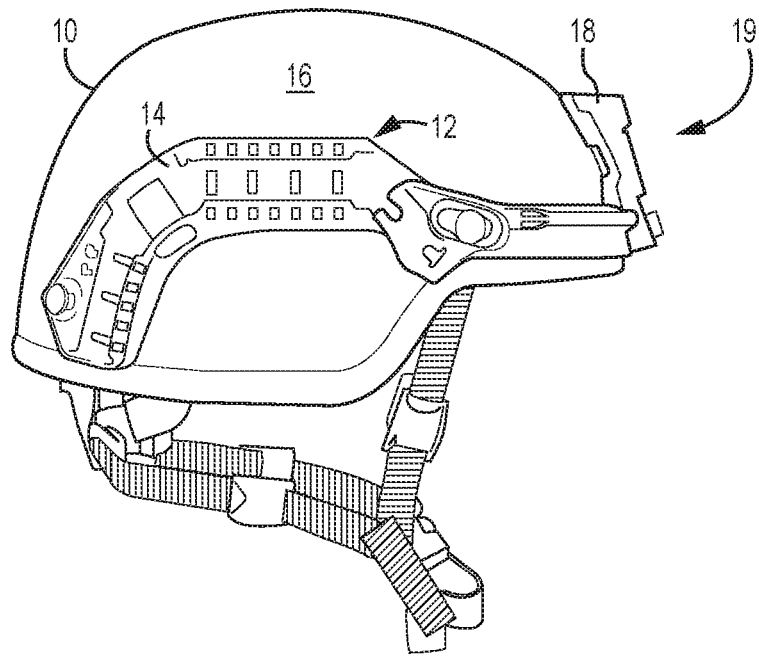
FIGS. 1A-1D illustrate a sensor system according to some embodiments.

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first side extension" and "second side extension," and does not imply a priority, a type, an importance, or other attribute, unless otherwise stated herein.

As used herein and in the claims, the articles "a" and "an" in reference to an element refers to "one or more" of the element unless otherwise explicitly specified.

Head-mounted displays may be used in a number of different contexts, such as training, entertainment, or during the performance of a task, for example. Head-mounted displays are sometimes used in conjunction with a sensor, such as a camera, that may sense attributes of an environment and alter the imagery that is displayed on the head-mounted display based on the sensed attributes. This may be useful, for example, in an augmented-reality context. Visualization systems that include a head-mounted display and a sensor are typically tightly integrated special-purpose assemblies manufactured as an integrated unit that offer no capability of using different display assemblies or different processing components.

In a military context, it would desirable to have a flexible system that could be relatively quickly adapted to be used with different display systems and different processing devices. It would also be desirable to have an architecture that facilitated the manufacture of different assemblies with different sensors without a need to redesign the entire system for each different combination of sensors. It would also be desirable for the system to be easily mountable to a helmet, to be rugged, and not to be adversely affected by electromagnetic interference (EMI) from other electronic systems that may be in proximity to the user.

The embodiments implement a sensor system that is mountable to a helmet. The sensor system includes a sensor sub-assembly that includes at least one sensor, and a cable having a plug that is configured to be plugged into a processing module. The sensor is communicatively coupled to the plug. Among other features, the sensor system facilitates the ability to upgrade processing modules for use with the same sensor system, without a need to remanufacture the sensor system. In some embodiments, the sensor sub-assembly further includes an external device interface that is configured to detachably couple to an external device, such as a display device, and which is communicatively coupled to the plug. This allows the sensor system to be used with any of a number of different external display devices.

Among other features, the embodiments facilitate a rugged augmented reality sensor system that can be integrated with a soldier's kit for use in any number of applications, such as maintenance, operations, and trainings. The pluggable features allow for switchable modules depending on the application. For example, one processing module may be utilized for a particular maintenance operation, and another processing module may be plugged into the sensor system for a training operation, and yet another processing module may be plugged in for another application. The sensor system is shielded from EMI, and is suitable for extreme environments that may involve shock, vibrations, and extreme temperatures.

FIG. 1A illustrates a helmet 10 with which embodiments may be practiced. The helmet 10 includes a helmet rail system 12. The helmet rail system 12 includes a right-side helmet rail 14 on a right side 16 of the helmet 10, and a matching left-side helmet rail (not illustrated) on the other side of the helmet 10. The helmet rail system 12 may be a conventional military rail system, such as a MIL-STD-1913 rail, sometimes referred to as a Picatinny rail. The helmet 10 also includes a front mount 18 at a front 19 of the helmet to which a display device may be mounted.

Figure 1B:
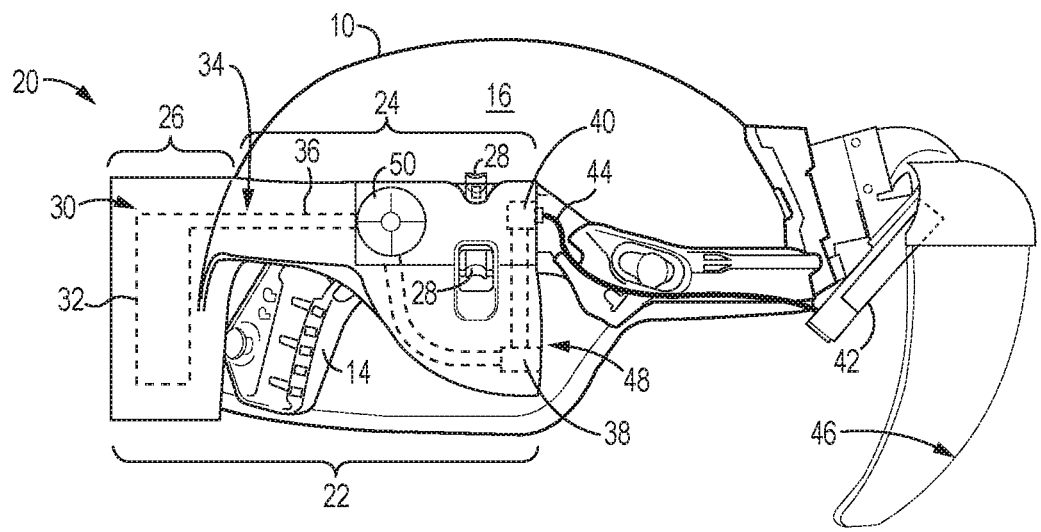

FIG. 1B illustrates the helmet 10 illustrated in FIG. 1 to which a sensor system 20 has been mounted according to one embodiment. The sensor system 20 includes a body 22 that includes a side extension 24 and a processing module support member 26. The side extension 24 includes a rail mount 28 configured to mount to the right-side helmet rail 14 (FIG. 1A). The processing module support member 26 is coupled to the side extension 24 and forms a chamber 30 that is configured to accommodate a processing module 32. In some examples, as will be discussed in greater detail below, the body 22 comprises a plastic shell, and the processing module support member 26 is coupled to the side extension 24 by virtue of the processing module support member 26 and the side extension 24 being parts of the plastic shell. While for purposes of illustration the processing module support member 26 is illustrated as being located behind the helmet 10, in other examples the processing module support member 26 may be located on top of the helmet 10.

A sensor sub-assembly 34 is positioned at least partially in the side extension 24. The sensor sub-assembly 34 includes a cable 36 comprising a plug configured to be plugged into the processing module 32, and a sensor 38 that is communicatively coupled to the plug via the cable 36. In some embodiments, the cable 36 is a flexible cable, or a flexible circuit cable (sometimes referred to as a "flex circuit"). The sensor 38 may comprise any type of sensor including, by way of non-limiting example, a sensor for head tracking of the wearer of the helmet 10, a sensor for hand gesture tracking of the wearer of the helmet 10, an infrared sensor such as a focal plane array, a visual spectrum sensor, such as a camera, a Long Wave IR sensor, a Short Wave IR sensor for thermal imaging, multi-axis motion tracking components such as a multi-axis gyroscope, a multi-axis accelerometer, a pressure sensor, a gesture tracking (RF/radar) sensor, an IR emitter, an optical transceiver, an acoustic sensor, a piezo sensor, a thermal sensor, and any other form of energy sensor. Moreover, while for purposes of illustration only a single sensor 38 is illustrated, the sensor sub-assembly 34 may comprise any number of sensors. In some embodiments the sensor 38 may be positioned in a nitrogen-purged sensor capsule. The sensor sub-assembly 34 may also include additional components, such as a laser projector, another energy-emitting component, or a haptic (vibrating) component configured to provide haptic feedback, or silent notifications. All of the components coupled to the sensor sub-assembly 34 may be communicatively coupled to the plug of the cable 36, facilitating communication between such components and the processing module 32. The sensor system 20 may also include wireless communication capabilities, such as WiFi capabilities, either via a wireless chip coupled to the sensor sub-assembly 34, or via the processing module 32.

In some embodiments, the sensor 38 is positioned at an end portion 48 of the side extension 24 and oriented such that the sensor 38 faces an environment in front of the helmet 10 to allow the sensor 38 to sense a characteristic of the environment in front of the helmet 10, such as one or more wavelengths of energy emitted or reflected by the environment in front of the helmet 10.

The body 22 also has a second side extension that is configured to mount to the left-side helmet rail. The second side extension may be configured substantially similar to or identically to the side extension 24. The second side extension may also include a sensor assembly that is configured substantially similar to or identically to the sensor sub-assembly 34. In some embodiments, similar or identical sensors may be located in both side extensions facilitating stereoscopic capabilities, including, by way of non-limiting example, range determination capabilities.

The sensor sub-assembly 34 may also include an external interface 40 that allows the connection of a display device 42 to the sensor system 20 via a cable 44. In some examples a partially reflective display surface 46 may be positioned such that the display device 42 may display imagery generated by the processing module 32 onto the display surface 46 for reflection into the eyes of a user of the helmet 10, such that the user can see both the imagery reflected by the display surface 46 and the real world through the display surface 46. In other embodiments, the display surface 46 may be integrated with the display device 42 and may not be see-through, such that the user can only view what is presented on the display surface 46.

In some examples, the sensor sub-assembly 34 also includes an input connector to which a navigation button 50 may be coupled. The navigation button 50 may be manipulated by a user to set various features of the sensor system 20. Manipulation of the navigation button 50 may cause a user interface to be displayed by the display device 42 onto the display surface 46 to allow the user to navigate through various menus, selections, settings, and the like.

Figure 1C:
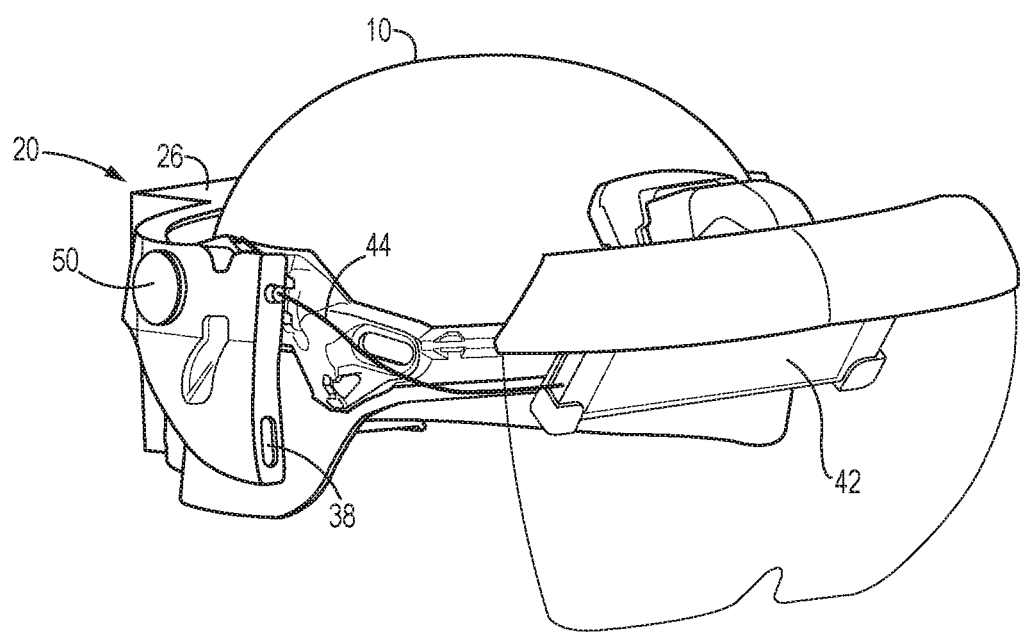
Figure 1D:
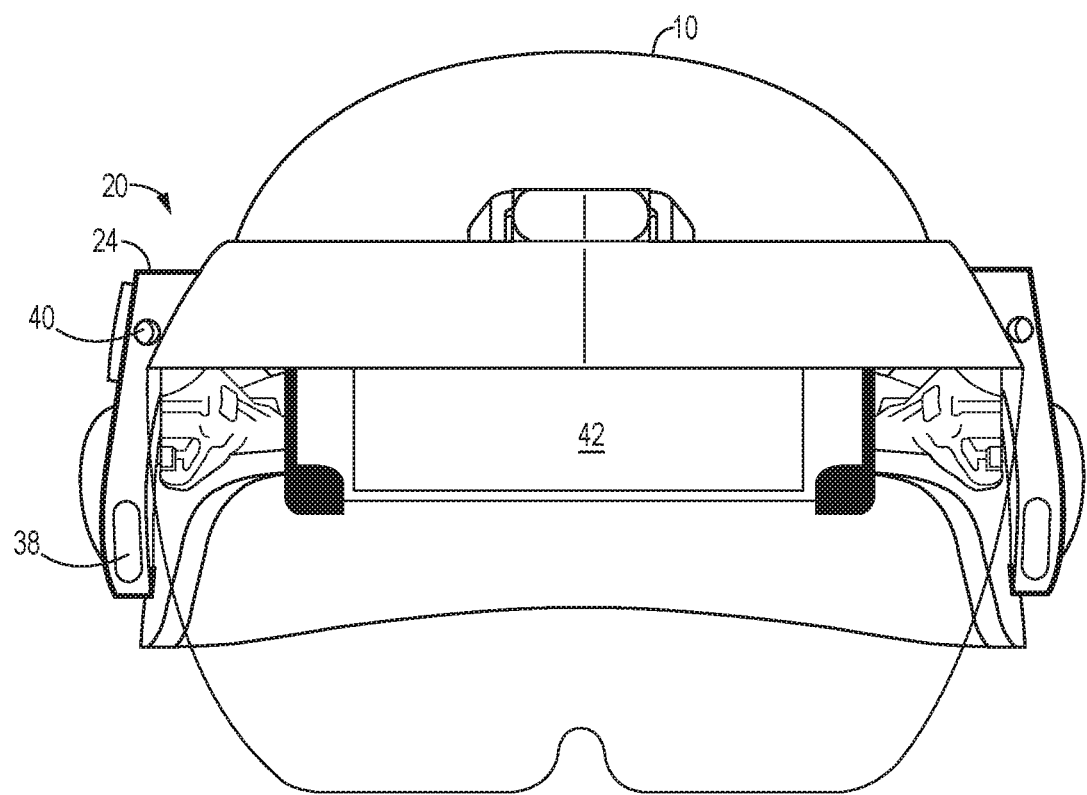

FIG. 1C illustrates another view of the sensor system 20. FIG. 1D is a front view of the sensor system 20 according to the embodiments illustrated in FIGS. 1A-1C.

Figure 2A:
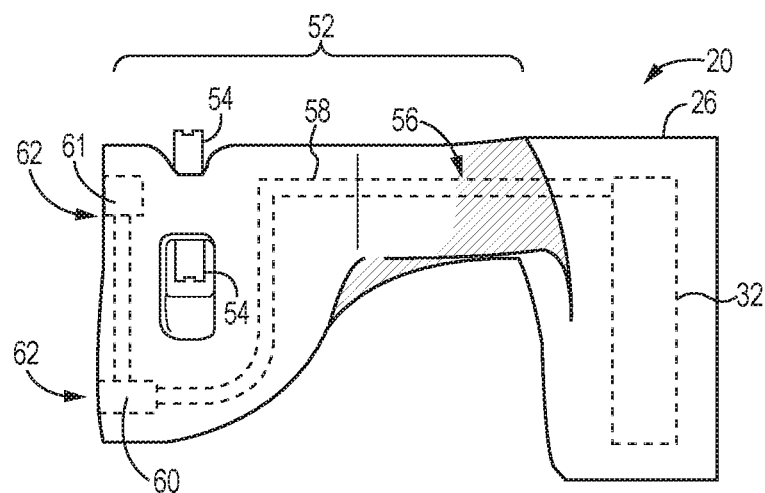
FIGS. 2A-2F illustrate additional details of a sensor system according to some embodiments.

FIG. 2A illustrates a side view of the sensor system 20 according to one embodiment. The sensor system 20 includes a side extension 52 that may be configured substantially similar to, or identical to, the side extension 24, located on the other side of the sensor system 20. The side extension 52 includes a rail mount 54 configured to mount to the right-side helmet rail 14 located on the helmet 10 (FIG. 1A). The processing module support member 26 is coupled to the side extension 52.

A sensor sub-assembly 56 is positioned at least partially in the side extension 52. The sensor sub-assembly 56 includes a cable 58 comprising a plug configured to be plugged into the processing module 32, and a sensor 60 that is communicatively coupled to the plug via the cable 58. In some embodiments, the cable 58 is a flexible cable. The sensor 60 may comprise any type of sensor including, by way of non-limiting example, a sensor for head tracking of the wearer of the helmet 10, a sensor for hand gesture tracking of the wearer of the helmet 10, an infrared sensor such as a focal plane array, a visual spectrum sensor, such as a camera, and the like. Moreover, while for purposes of illustration only a single sensor 60 is illustrated, the sensor sub-assembly 56 may comprise any number of sensors. In some embodiments the sensor 60 may be positioned in a nitrogen-purged sensor capsule. The sensor sub-assembly 56 may also include additional components, such as a laser projector or other energy-emitting component. All of the components coupled to the sensor sub-assembly 56 may be communicatively coupled to the plug of the cable 58, facilitating communication between such components and the processing module 32. In some embodiments, the sensor sub-assembly 56 may also include an external device interface 61 for connection to an external device, such as a display device, or any other suitable external device.

In some embodiments, the sensor 60 is positioned at an end portion 62 of the side extension 52 and oriented such that the sensor 60 faces an environment in front of the helmet 10 to allow the sensor 60 to sense a characteristic of the environment in front of the helmet 10, such as one or more wavelengths of energy emitted or reflected by the environment in front of the helmet 10.

Figure 2B:
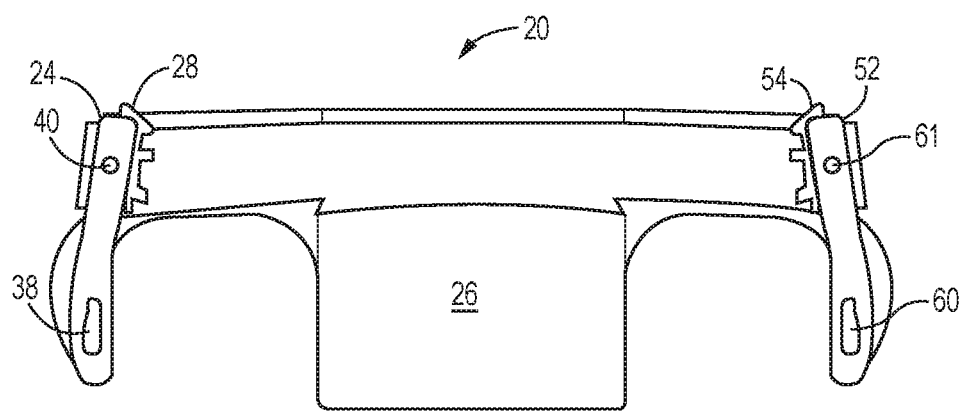
Figure 2C:
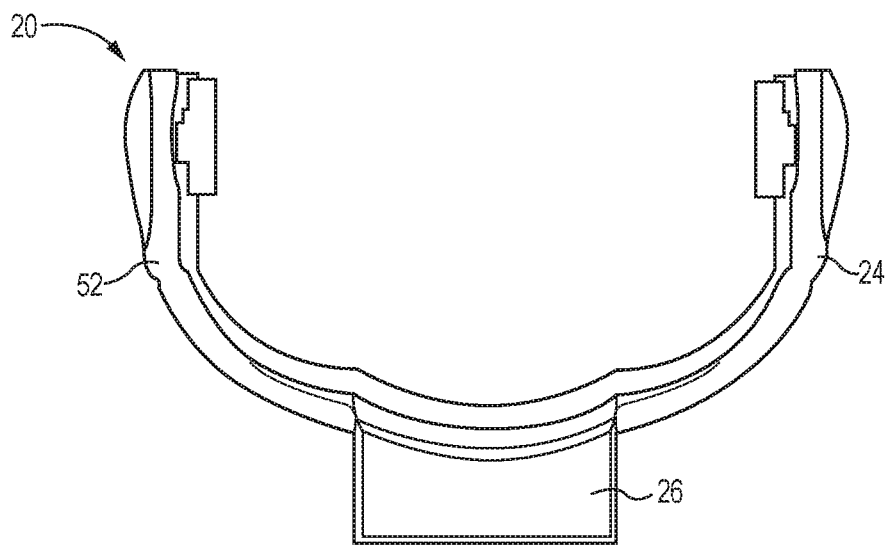
Figure 2D:
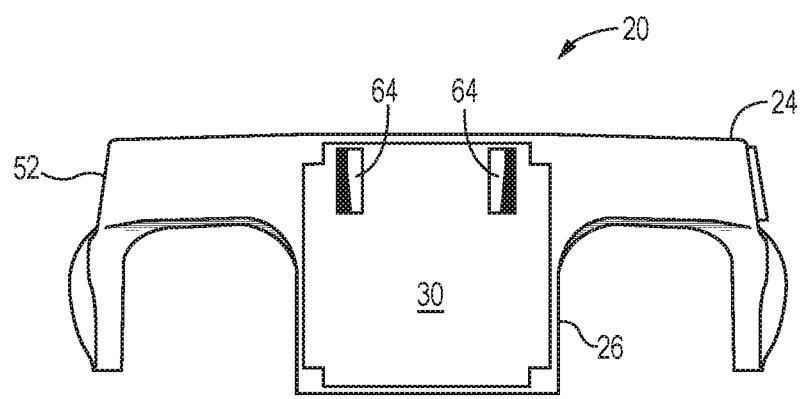

FIG. 2B is a front view of the sensor system 20 according to one embodiment. FIG. 2C is a bottom view of the sensor system 20 according to one embodiment. FIG. 2D is a rear view of the sensor system 20 according to one embodiment. In some examples the processing module support member 26 forms the chamber 30 in which the processing module 32 (not illustrated in FIG. 2D) may be positioned. The processing module support member 26 may have openings 64 to each of the side extensions 24 and 52, to allow end portions of the cables 36, 58 that contain plugs to be exposed to the chamber 30, to facilitate connection of the cables 36, 58 via the plugs to the processing module 32 either during manufacture of the sensor system 20, or subsequently, for example, to upgrade the processing module 32. In some embodiments, the side extension 24 and/or the side extension 52 may have one or more rear facing sensors positioned at the rear of the side extensions 24, 52 that look in a direction behind the wearer of the helmet 10, and/or sensors that face directions to the sides of the wearer of the helmet 10, to provide a 360 degree view. The use of multiple sensors may also facilitate unique stereoscopic sensor views.

Figure 2E:
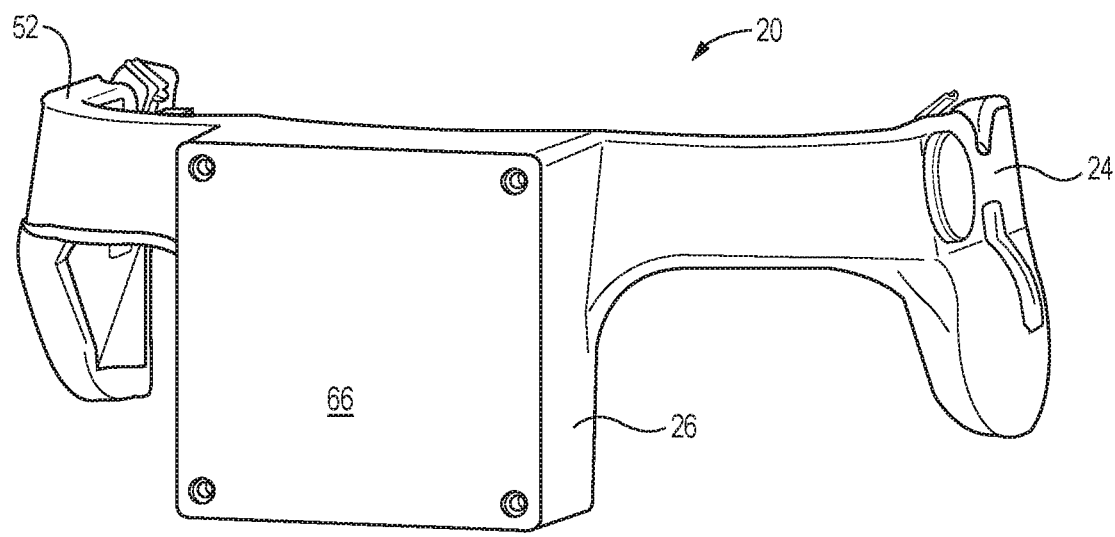
Figure 2F:
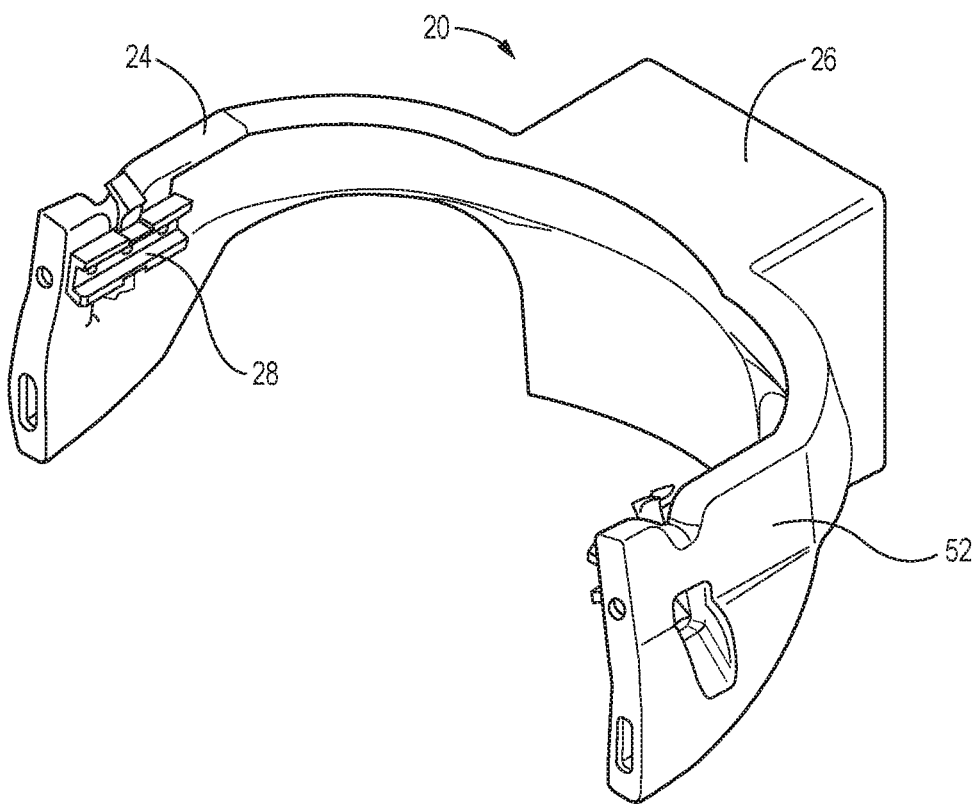

FIG. 2E is another rear view of the sensor system 20 according to one embodiment. In this example, the processing module support member 26 has a cover 66 fixed to the processing module support member 26 to protect the processing module 32 from the environment. FIG. 2F is a perspective view of the sensor system 20. In some embodiments, a display may be mounted on the cover 66 that provides a system status of various attributes of the sensor system 20, such as, by way of non-limiting example, network connectivity, a battery level, and the like.

Figure 3:
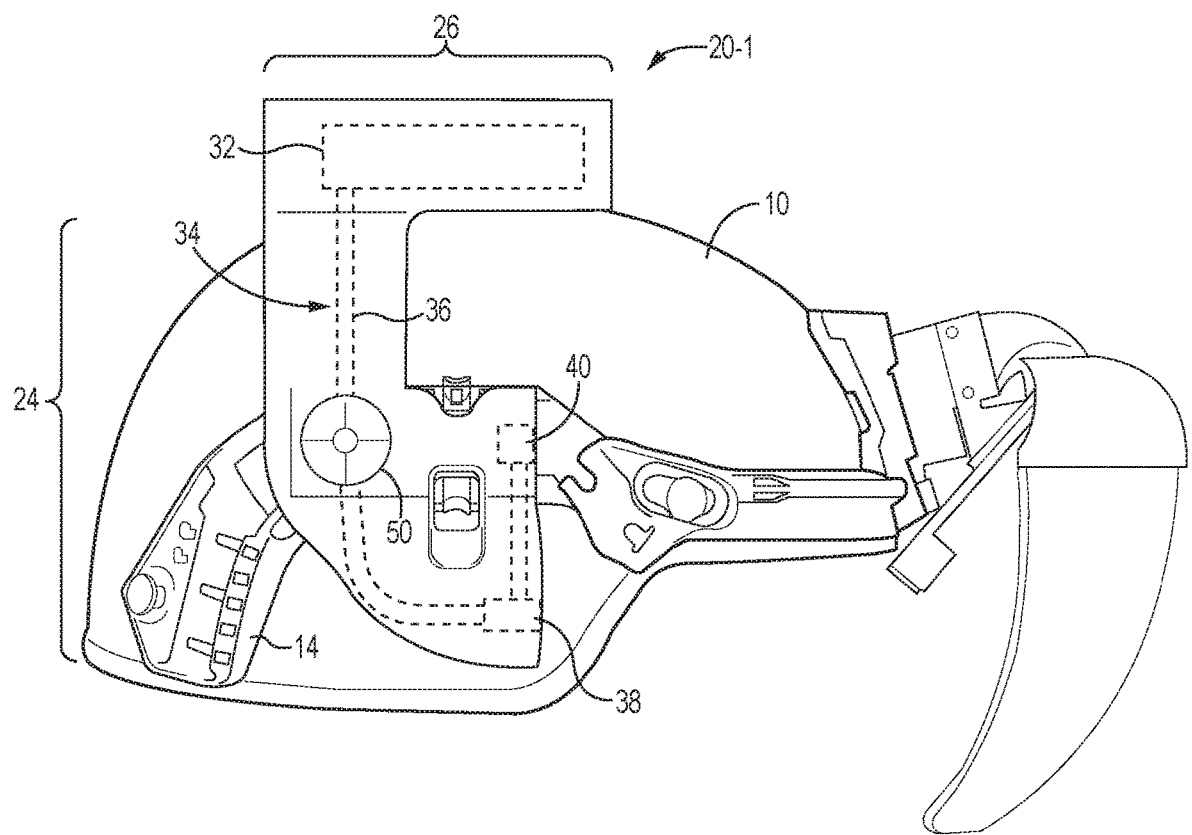
FIG. 3 illustrates a sensor system according to another embodiment.

FIG. 3 is a diagram of a sensor system 20-1 according to another embodiment. The sensor system 20-1 is substantially identical to the sensor system 20 discussed above with regard to FIGS. 1A-1D, except the processing module support member 26 is positioned on top of the helmet 10 instead of on the back of the helmet 10.

Figure 4:
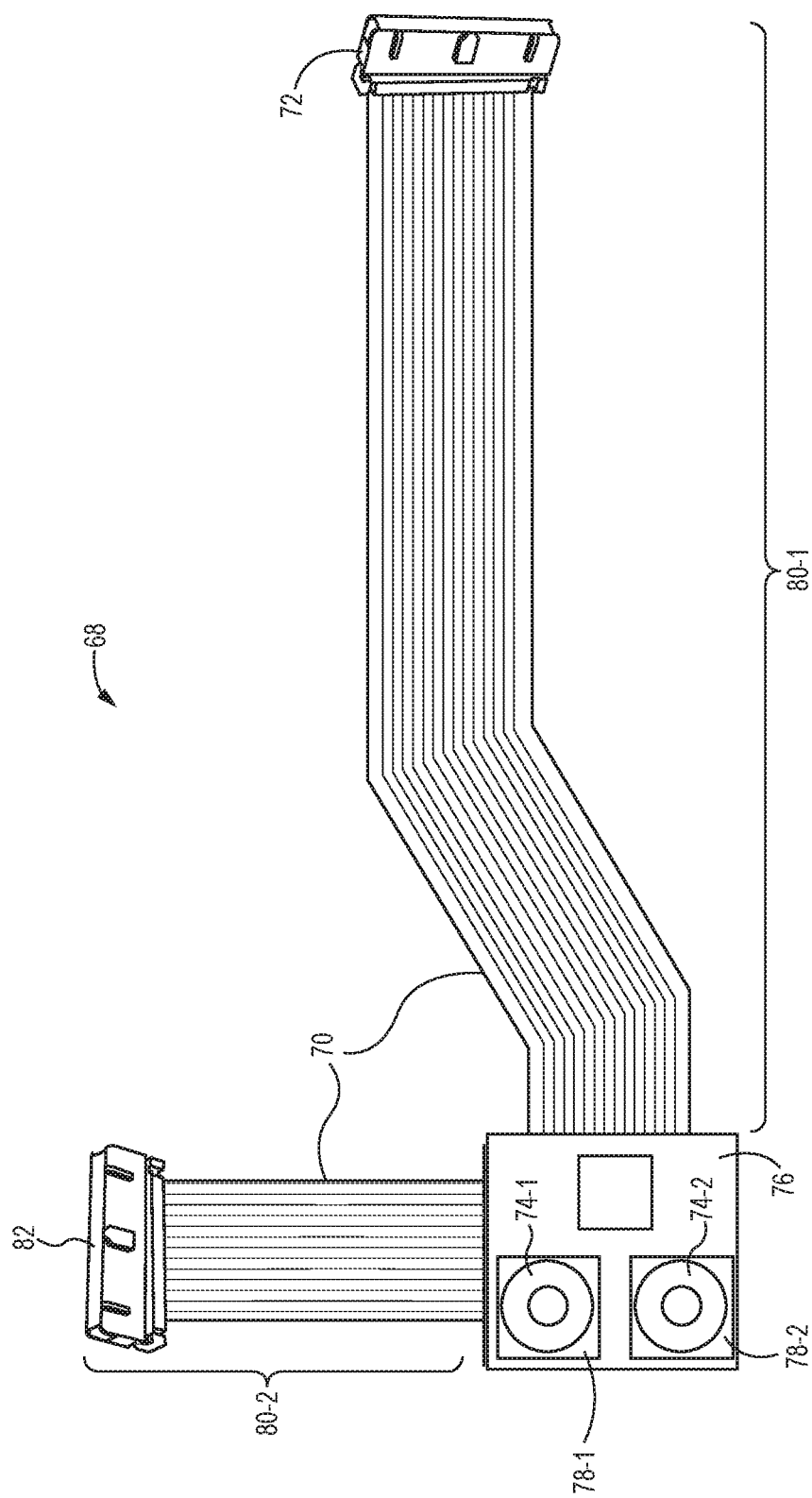
FIG. 4 illustrates a sensor assembly according to one embodiment.

FIG. 4 is a schematic diagram of a sensor sub-assembly 68 according to one embodiment suitable for positioning, at least partially, in the side extensions 24, 52. The sensor sub-assembly 68 may be substantially similar to, or identical to, the sensor sub-assembly 34, except as otherwise discussed herein. The sensor sub-assembly 68 includes a cable 70 that includes a plug 72. The cable 70, in some examples, is a flexible cable. The plug 72 may be any suitable connector, such as, by way of non-limiting example, an LSHM series connector available from SAMTEC USA, 520 Park East Boulevard, P.O. Box 1147, New Albany, Ind. 47151-1147. As discussed above, and below, the plug 72 is configured to connect to the processing module 32. The sensor sub-assembly 68 also includes a sensor 74-1 that is communicatively coupled to the plug 72 via the cable 70. As discussed above, the sensor 74-1 may be positioned in the side extension 24, 52 to be oriented toward the front of the wearer, and to be exposed to the environment in front of the wearer to sense characteristics of the environment in front of the wearer. The sensor 74-1 may comprise any suitable sensor, such as an audio sensor, a wavelength sensor (i.e., a FPA or a CMOS or CCD sensor) for any desired wavelengths of electromagnetic radiation. In this example, the sensor sub-assembly 68 comprises two sensors 74-1, 74-2 (generally, sensors 74). In some examples, the sensors 74 may be encapsulated in a nitrogen-purged capsule. The sensors 74 may be coupled to a printed circuit board (PCB) 76 that is connected to the cable 70. In some examples, the PCB 76 may have one or more surface mount component pads 78-1, 78-2 that facilitate the mounting of BGA-style packaged sensors 74 onto the PCB 76.

In this example, the cable 70 includes a first portion 80-1 and a second portion 80-2. The cable 70 may comprise, for example, a flex circuit. The first portion 80-1 extends from the plug 72 to the PCB 76. The second portion 80-2 extends from the PCB 76 to an external interface 82 that is configured to detachably couple to a display device, such as the display device 42 (FIG. 1B). The PCB 76 is configured to electrically couple the first portion 80-1 to the second portion 80-2 so that electrical signals, such as data signals and/or power signals, can be communicated between the external interface 82 and the plug 72.

Figure 5A:
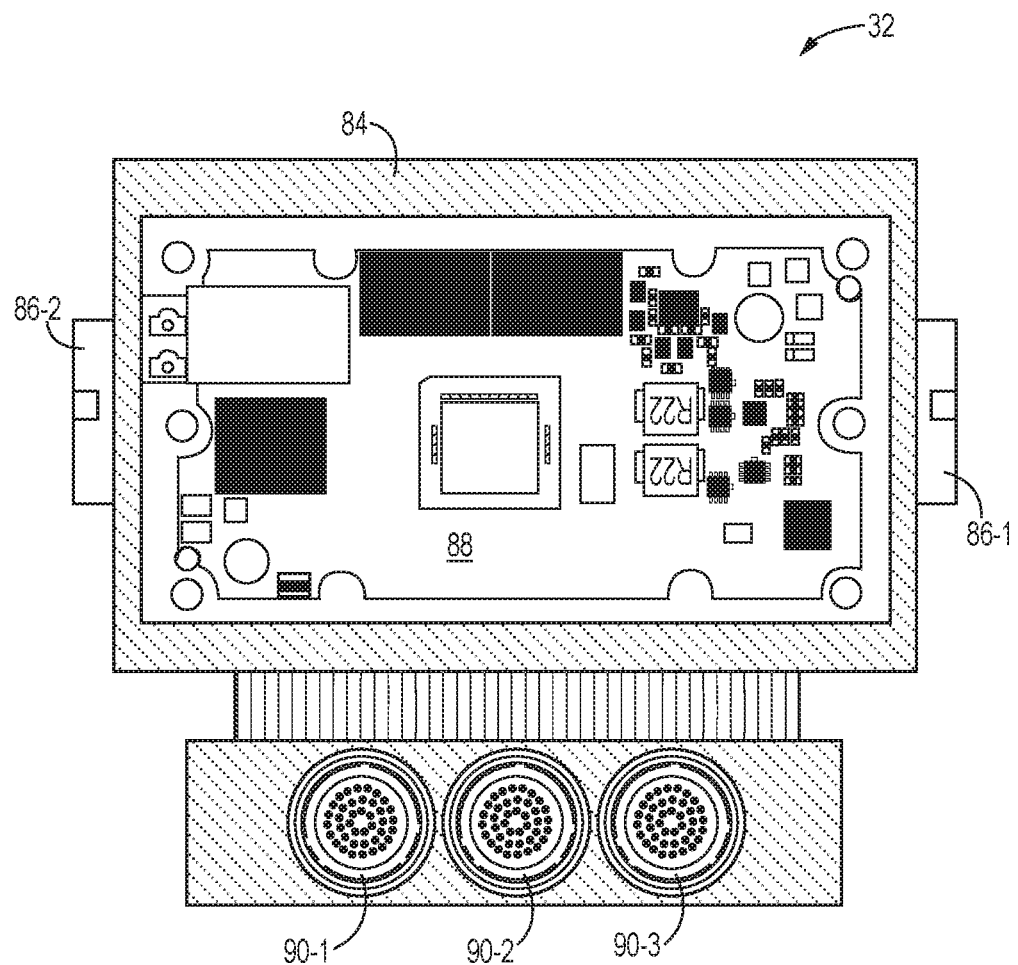
FIGS. 5A-5C illustrate a processing module according to one embodiment.

FIG. 5A illustrates the processing module 32 according to one embodiment. The processing module 32 includes a PCB 84 that includes plugs 86-1 and 86-2. The plug 86-1 is configured to connect to a plug of a sensory sub-assembly positioned at least partially in one of the side extensions 24, 52, such as the plug 72 of the sensor sub-assembly 68 illustrated in FIG. 4. The plug 86-2 is configured to connect to a plug of a sensory sub-assembly positioned at least partially in the other side extension 24, 52.

The PCB 84 is coupled to a processor device 88 that, via the plugs 86-1, 86-2, is communicatively coupled to the sensors in both side extensions 24, 52, such as the sensors 74-1, 74-2, and the external interface 82. The processor device 88 may comprise any suitable processor device, such as, by way of non-limiting example, a Jetson TX1 processor device, available from NVIDIA Corporation, 2701 San Tomas Expressway, Santa Clara, Calif. 95050. The processor device 88 may include wireless communications. The plugs 86-1, 86-2 facilitate the removal of the processing module 32 from the sensor system 20 to upgrade the processor device 88 without a need for re-soldering or other relatively complex disconnection techniques. The processing module 32 may also include one or more connections 90-1-90-3 which may, for example, allow power to be provided to the sensor system 20, allow connection to a network, or facilitate other capabilities. The processing module 32 may also include wireless communications capabilities.

In some embodiments the processing module 32 may also include thermal management, such as an AL6062 cover plate 66 with standoffs, a thermal gap filler pad, and a solid conduction cold plate.

Figure 5B:
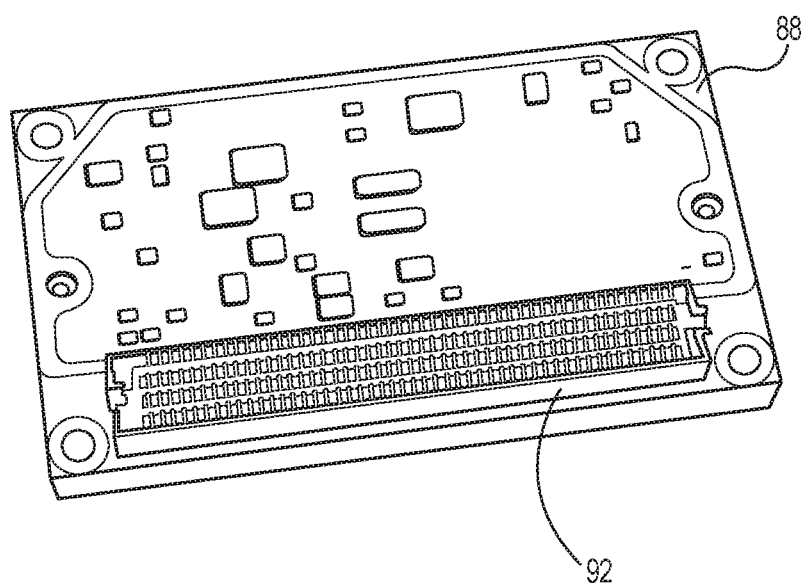
Figure 5C:
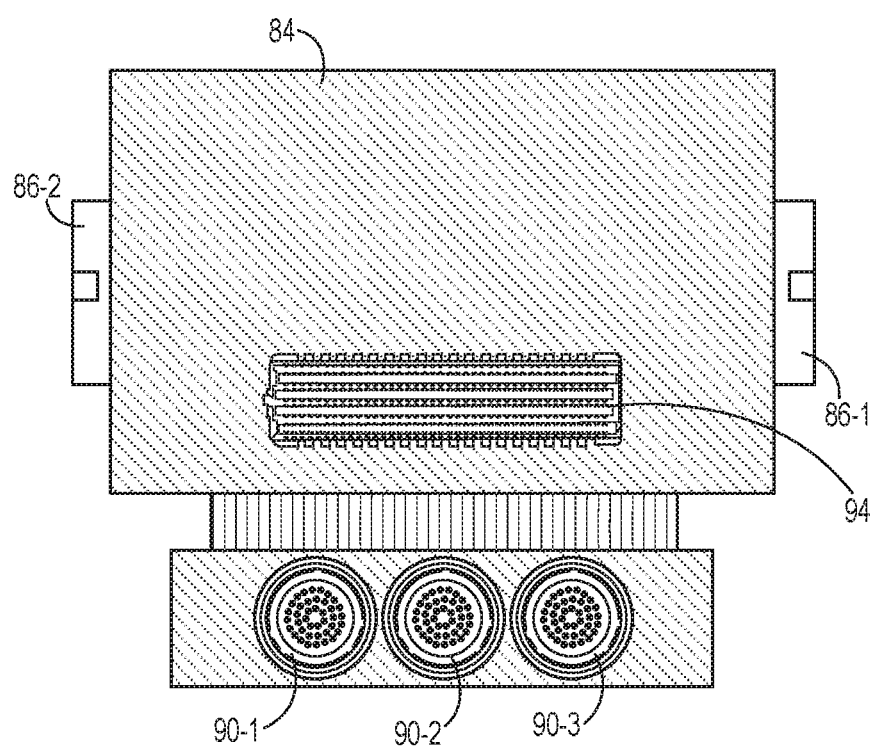

FIG. 5B is a back view of the processor device 88 according to one embodiment. In this embodiment the processor device 88 includes a pluggable electrical interface 92 that facilitates easy connection and disconnection to the PCB 84. FIG. 5C illustrates a corresponding electrical interface 94 on the PCB 84 that is configured to couple to the pluggable electrical interface 92 of the processor device 88.

FIGS. 6A-6D illustrate a method for manufacturing the sensor system 20 according to one embodiment. Initially, a plastic body substrate 96 is formed. The plastic body substrate 96 includes the side extension 24 that forms a first channel 100. The plastic body substrate 96 includes the second side extension 52 that forms a second channel that is substantially similar to the first channel 100. In some embodiments, the plastic body substrate may include electromagnetic interference (EMI) shielding material, such as copper, steel, silver, nickel-plated carbon fiber/graphite powder, or the like. The plastic body substrate 96 may, in some embodiments, be injection molded. The side extension 24 and the second side extension 52 may form one or more openings 102 to allow sensors to be oriented toward the front of the wearer, as discussed above. The plastic body substrate 96 also includes the processing module support member 26. The plastic body substrate 96 forms the openings 64 so that the first channel 100 and the second channel are in communication with the chamber 30 formed by the processing module support member 26. The openings 64 facilitate the insertion of the plugs at the ends of the sensor sub-assemblies 34, 56 into the chamber 30 for connection to the processing module 32. In one embodiment, the sensor sub-assemblies 34, 56 may be inserted into the first channel 100 and the second channel, and the plugs of the sensor sub-assemblies 34, 56 inserted into the openings 64 to expose the plugs to the chamber 30.

Figure 6A:
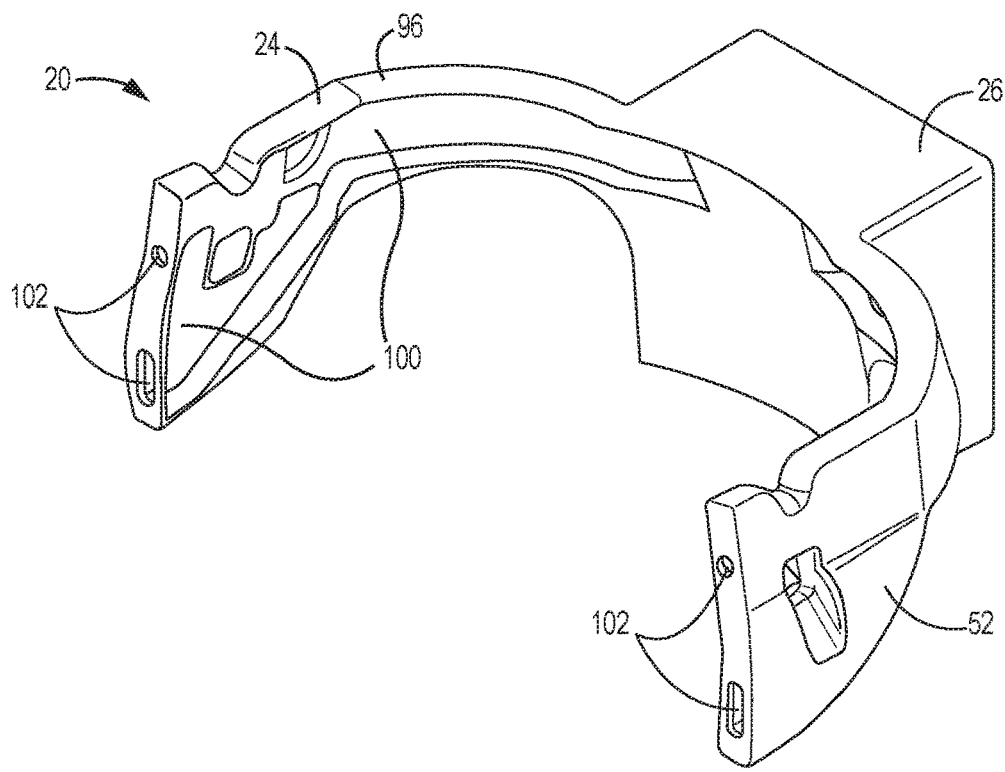
FIGS. 6A-6D illustrate a method for manufacturing a sensor system according to one embodiment.
Figure 6B:
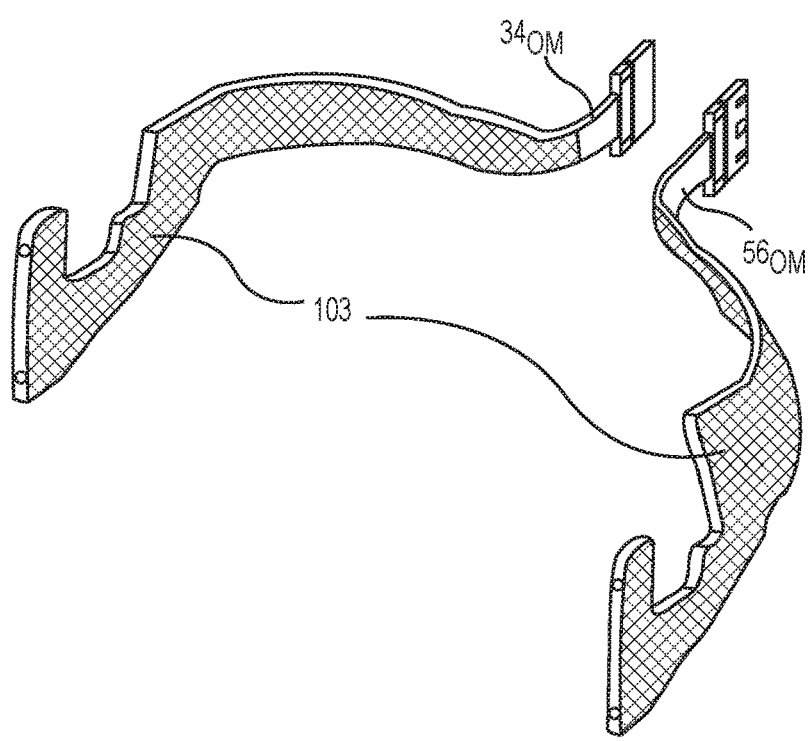

FIG. 6B illustrates another embodiment wherein the sensor sub-assemblies 34, 56 may be overmolded with a first overmold material 103 to form overmolded sensor sub-assemblies $34_{OM}$, $56_{OM}$. The first overmold material 103 may be a non-conductive insulating overmold material such as silicon, or the like. The sensor sub-assemblies $34_{OM}$, $56_{OM}$ may be overmolded to take a shape suitable for insertion into the first channel 100 and the second channel. In other embodiments, the sensor sub-assemblies 34, 56 may not be overmolded, and may be placed directly in the first channel 100 and the second channel. In yet other embodiments, rather than an overmold material, the sensor sub-assemblies 34, 56 may be coated with a dielectric material prior to being positioned in the first channel 100 and the second channel.

Figure 6C:
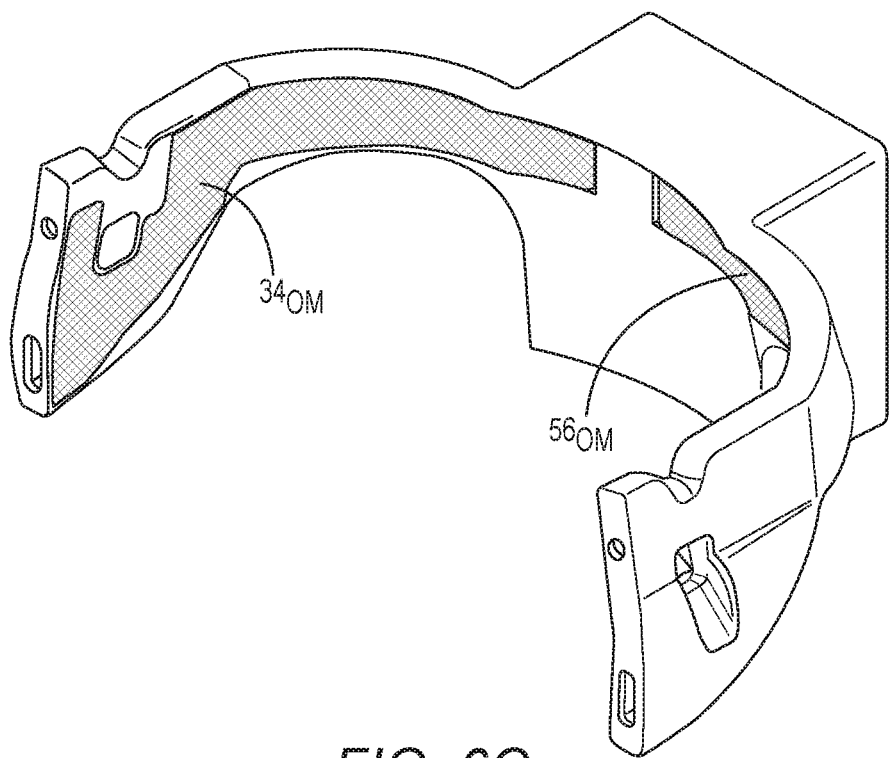
Figure 6D:
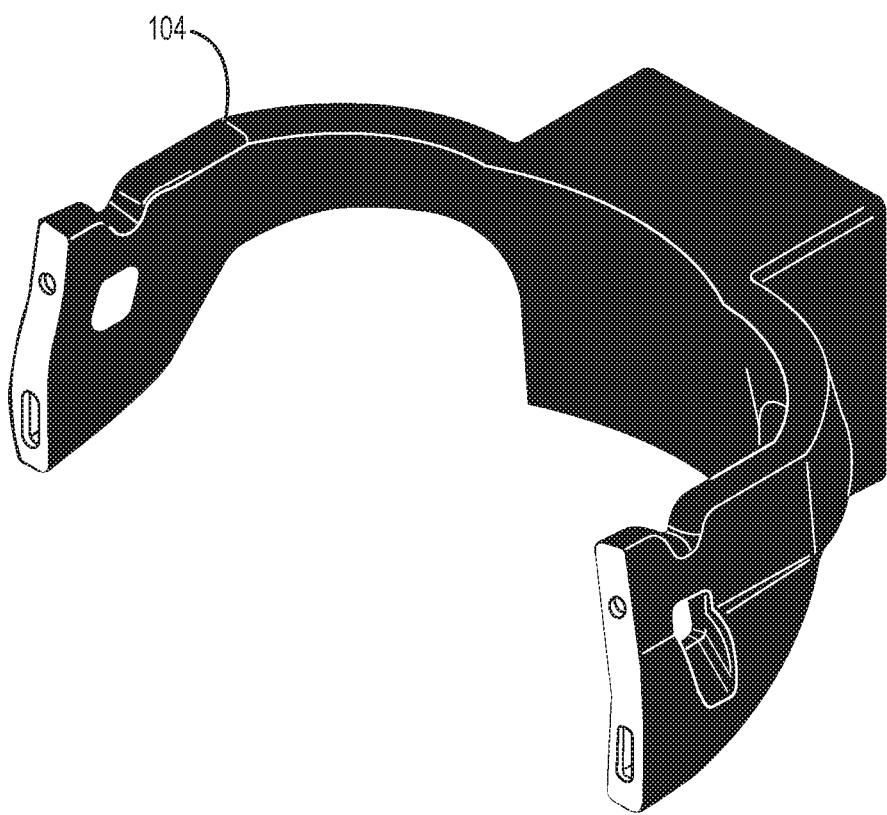

FIG. 6C illustrates the sensor sub-assemblies $34_{OM}$, $56_{OM}$ inserted into the first channel 100 and the second channel. FIG. 6D illustrates a second overmolding process wherein the plastic body substrate 96 is overmolded with a second overmold material 104. The second overmold material 104 may comprise a conductive EMI shielding material such as silver, copper, steel, silver-plated aluminum, or the like, mixed with rubber, silicone, or the like. As discussed above, in some embodiments, the sensor sub-assemblies 34, 56 may not be overmolded, and the step illustrated in FIG. 6C may be the only overmold process performed.

Figure 7:
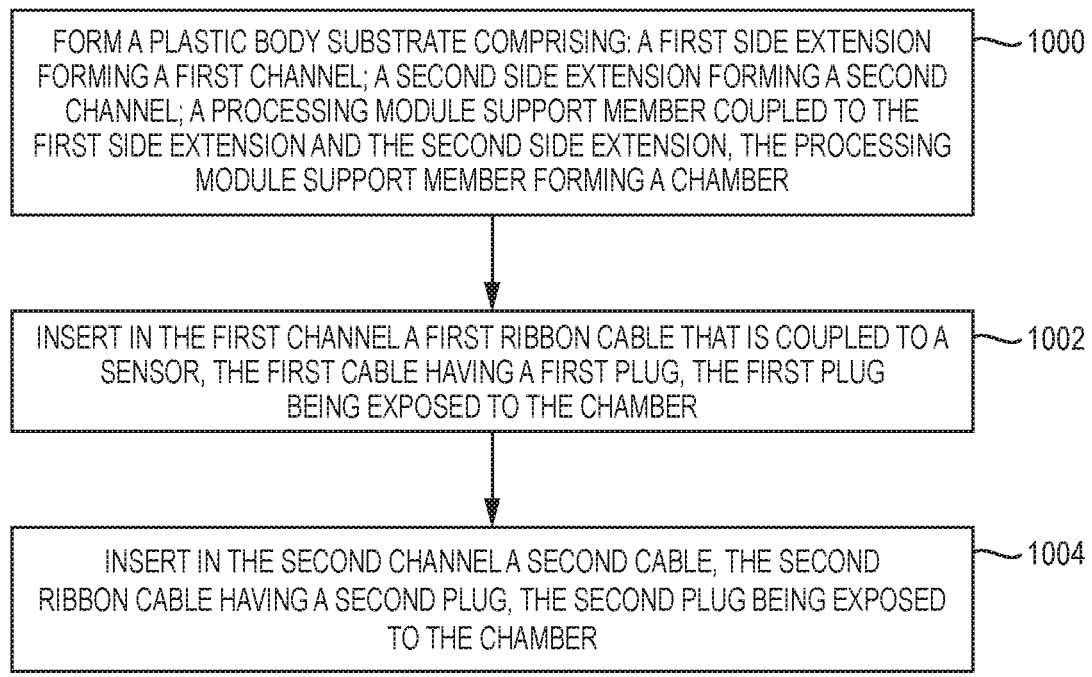
FIG. 7 is a flowchart of a method for manufacturing a sensor system according to one embodiment.

FIG. 7 is a flowchart of a method for manufacturing the sensor system 20 according to one embodiment. FIG. 7 will be discussed in conjunction with FIGS. 6A-6D. Initially, the plastic body substrate 96 is formed, the plastic body substrate 96 includes the side extension 24 that forms the first channel 100, and the second side extension 52 that forms the second channel. The plastic body substrate 96 also forms the processing module support member 26 coupled to the side extension 24 and the second side extension 52, and the processing module support member 26 forms the chamber 30 (block 1000).

A first cable that is coupled to a sensor is inserted in the first channel 100. The first cable has a first plug, and the first plug is exposed to the chamber 30 (block 1002). A second cable is inserted in the second channel. The second cable has a second plug, and the second plug is exposed to the chamber 30 (block 1004). The processing module 32 may be inserted into the chamber 30 and coupled to the first and second plugs.

Among other features, the embodiments facilitate a rugged augmented reality sensor system that can be integrated with a soldier's kit for use in any number of applications, such as maintenance, operations, and trainings. The pluggable features allow for switchable modules depending on the application. For example, one processing module 32 may be utilized for a particular maintenance operation, and another processing module 32 may be plugged into the sensor sub-assemblies for a training operation, and yet another processing module 32 may be plugged in for another application. The sensor system 20 is shielded from EMI, and is suitable for extreme environments that may involve shock and vibrations.

Those skilled in the art will recognize improvements and modifications to the preferred embodiments of the disclosure. All such improvements and modifications are considered within the scope of the concepts disclosed herein and the claims that follow.

What is claimed is:

1. A sensor system comprising:
   a body, comprising:
   a first side extension configured to mount to a helmet;
   a second side extension configured to mount to the helmet; and
   a processing module support member contiguous with each of the first side extension and the second side extension, and configured to accommodate a processing module; and
   a first sensor sub-assembly comprising:
   a first cable comprising a first plug configured to be plugged into the processing module; and
   a first sensor positioned within the first side extension and communicatively coupled to the first plug via the first cable.

2. The sensor system of claim 1 wherein the first cable comprises a flexible circuit cable.

3. The sensor system of claim 2 further comprising a first overmold material that surrounds at least a portion of a length of the cable, the first overmold material being devoid of conductive particles.

4. The sensor system of claim 3 further comprising a second overmold material that surrounds at least a portion of the first overmold material, the second overmold material comprising a conductive electromagnetic interference (EMI) shielding material.

5. The sensor system of claim 4 wherein the conductive EMI shielding material comprises one of steel, copper or silver.

6. The sensor system of claim 1 further comprising a second sensor sub-assembly positioned at least partially in the second side extension comprising:
- a second cable comprising a second plug configured to be plugged into the processing module; and
- a second sensor communicatively coupled to the second cable.

7. The sensor system of claim 1 wherein the first side extension comprises a first end portion configured to, when coupled to the helmet, face an environment in front of the helmet, and wherein the first sensor is positioned in the first end portion to sense a characteristic of the environment in front of the helmet.

8. The sensor system of claim 7 wherein the first sensor sub-assembly further comprises a second sensor communicatively coupled to the first plug via the first cable, and wherein the second sensor is positioned in the first end portion to sense a characteristic of the environment in front of the helmet.

9. The sensor system of claim 7 further comprising a second sensor sub-assembly comprising:
- a second cable comprising a second plug configured to be plugged into the processing module; and
- a second sensor positioned within the second side extension communicatively coupled to the second cable;
- wherein the second side extension comprises a second end portion configured to, when coupled to the helmet, face the environment in front of the helmet, and wherein the second sensor is positioned in the second end portion to sense a characteristic of the environment in front of the helmet.

10. The sensor system of claim 1 wherein the first sensor sub-assembly further comprises an external interface configured to detachably couple to a display device, the external interface being in electrical communication with the first plug.

11. The sensor system of claim 1 wherein the first side extension comprises a first rail mount configured to mount to a first helmet rail on a first side of the helmet and the second side extension comprises a second rail mount configured to mount to a second helmet rail on a second side of the helmet.

12. The sensor system of claim 1 wherein the first side extension and the second side extension comprise an overmold material that includes a conductive electromagnetic interference (EMI) shielding.

13. The sensor system of claim 1 wherein the first sensor sub-assembly further comprises a nitrogen-purged sensor capsule, and wherein the first sensor is positioned in the nitrogen-purged sensor capsule.

14. The sensor system of claim 1 wherein the first cable comprises a flexible cable having a first portion and a second portion, and the first sensor sub-assembly further comprises:
- a printed circuit board and the first sensor is coupled to the printed circuit board; wherein:
- the first portion of the flexible cable extends from the first plug to the printed circuit board;
- the second portion extends from the printed circuit board to an external interface that is configured to detachably couple to a display device; and
- wherein the printed circuit board is configured to electrically couple the first portion to the second portion so that electrical signals can be communicated between the external interface and the first plug.

15. The sensor system of claim 1 wherein the first side extension forms an opening between the first sensor and an external environment that allows energy in the external environment to be communicated to the first sensor.

* * * * *